REMOTE CONTROL WEAPON SYSTEM

Filed Sept. 10, 1965 2 Sheets-Sheet 1

INVENTOR
William E. Loyd

BY Jacobi & Davidson

ATTORNEYS

Dec. 17, 1968 W. E. LOYD 3,417,198

REMOTE CONTROL WEAPON SYSTEM

Filed Sept. 10, 1965 2 Sheets-Sheet 2

INVENTOR

William E. Loyd

BY Jacobi & Davidson

ATTORNEYS

United States Patent Office 3,417,198
Patented Dec. 17, 1968

3,417,198

REMOTE CONTROL WEAPON SYSTEM

William E. Loyd, 605 N. Sycamore Ave., Hollywood, Calif. 90036

Filed Sept. 10, 1965, Ser. No. 486,440
6 Claims. (Cl. 178—6.8)

ABSTRACT OF THE DISCLOSURE

A system is disclosed for automatically detecting the presence of an intruder or criminal in a certain area, the system having provisions for apprehending the criminal upon detection during or immediately subsequent to the commiting of the crime. A closed circuit television camera is provided at each of a plurality of locations and interconnected to a central station comprising a television receiver via a time multiplexing means which couples each of the television cameras at the plurality of the locations one at a time, in a predetermined sequence, for a predetermined time duration to the central station. While each television camera is connected to the central station, an automatic panoramic scanning of the same takes place. Associated with each of the television cameras is an energy releasing means capable of immobilizing a human. The system is operated such that when a criminal or intruder is detected by the television camera at a specific location, the automatic panoramic scan and the multiplex switching of the system is temporarily terminated and the operator at the control station would then cause a signal to be sent to the energy releasing means at the particular location to disable the criminal found thereat.

The present invention relates generally to systems for apprehending criminals and more particularly to a system including a closed circuit television camera in combination with a weapon for immobilizing a criminal.

With the rapidly mounting crime rate, particularly with regard to establishments such as banks and department stores, the need exists for a device or system that will enable criminals to be apprehended while committing a crime or shortly thereafter as they are escaping from the scene. Such a system should, of course, be relatively inexpensive with regard to total overall cost, an object that is achieved by employing a minimum amount of personnel. While many systems have been devised for automatically detecting the presence of an intruder or criminal in a certain area, few if any, include provision for apprehending the criminal during or immediately subsequent to the commission of the crime. Thus, with most prior art detection systems the criminal is given the opportunity to escape from the scene of the crime because of the considerable time necessary for law enforcement personnel to arrive thereat.

According to the present invention, these problems are obviated by providing a closed circuit television camera positioned to view each area that it is desired to be protected. In combination with the closed circuit television camera, there is provided a weapon adapted to be triggered from a remote location, where the closed circuit television receiver is located, which weapon is designed to immobilize the criminal so that he can be apprehended.

According to one embodiment of the present invention, there is mounted on the closed circuit television camera a weapon designed to immobilize the criminal while he is the act of committing the crime. The camera and weapon are aimed at approximately the same locations so that personnel, i.e., a guard, located before the closed circuit television receiver responsive to the signal from the closed circuit camera, can initiate a signal to fire the weapon at the criminal when the camera and gun are pointed at him. In normal operation, the camera panoramically sweeps the entire area under surveillance. When the guard observes a crime being committed, he terminates the panning motion of the camera and manually directs it, by remote control, at the criminal. When the camera is aimed at the criminal, as the guard is able to ascertain from the crossed hairs provided on the camera lens, the weapon is of course also directed at him. Thereby, the criminal can be immobilized in response to the signal activated by the guard from the remote location.

According to another embodiment of the invention, a weapon is mounted at each door of a protected establishment and is arranged to direct an immobilizing projectile along the threshold. The weapon is selectively enabled by the guard at the central station, where the closed circuit television receiver is located, when the guard observes a crime being committed via the television network. The weapon is triggered, after being enabled, by the criminal crossing the threshold. Preferably triggering is in response to a signal derived by the escaping criminal breaking a light beam that activates a photoelectric circuit.

To make the present invention economically feasible, it is preferred that a single guard monitor a plurality of areas simultaneously. A time division multiplex system is provided between each of the several cameras and the single monitor before the guard. Thereby, occurrences at each of the protected areas are sequentially presented before the guard for a predetermined time period. If, during a camera scan of the protected area the guard observes nothing unusual, the system automatically switches so the camera at the next protected area is in circuit with the receiver at the central location. In response to the guard terminating the panning action of the camera, when he observes the occurrence of an unusual act, multiplexing of the camera to the receiver discontinues and is not reinitiated until the guard reactivates the system to automatic panning.

A feature of the invention is that the weapon need not fire a projectile that will cause injury to the criminal. Instead, the weapon can be provided with tranquilizing pellets that merely cause the criminal to become unconscious, i.e., to fall asleep. The utilization of tranquilizing projectiles has the advantage of preventing possible harm to innocent bystanders, as well as enabling the facile capture of criminals.

It is, accordingly, an object of the present invention to provide a new and improved system for apprehending criminals while they are in the act of committing a crime or shortly thereafter.

Another object of the present invention is to provide a system wherein a guard at a central location can direct and fire projectile firing weapons toward criminals at a plurality of locations to be guarded.

A further object of the invention is to provide a projectile firing weapons that is moved in synchronism with a closed circuit television camera so that a person watching the monitor or receiver with which the camera is encoupled can aim the weapon at a criminal committing a crime.

Still another object of the invention is to provide a new and improved system for protecting designated areas with a closed circuit television system provided with additional means for apprehending a criminal.

An additional object of the invention is to provide a new and improved system for disabling a criminal from a remote location without inflicting permanent harm to the criminal or any possible innocent bystanders.

Yet an additional object of the invention is to provide a new and improved system for apprehending a criminal wherein the camera of a closed circuit television network is provided with means to enable the viewer of a monitor to ascertain visually that a weapon moved with the camera is aimed at a particular object.

A further object of the invention is to provide a system for apprehending an escaping criminal from a remote location that is coupled with the scene of the crime via a closed circuit television network.

The above and still further objects, features and advantages of the present invention will become apparent upon consideration of the following detailed description of several specific embodiments thereof, especially when taken in conjunction with the accompanying drawings, wherein.

Figure 1:
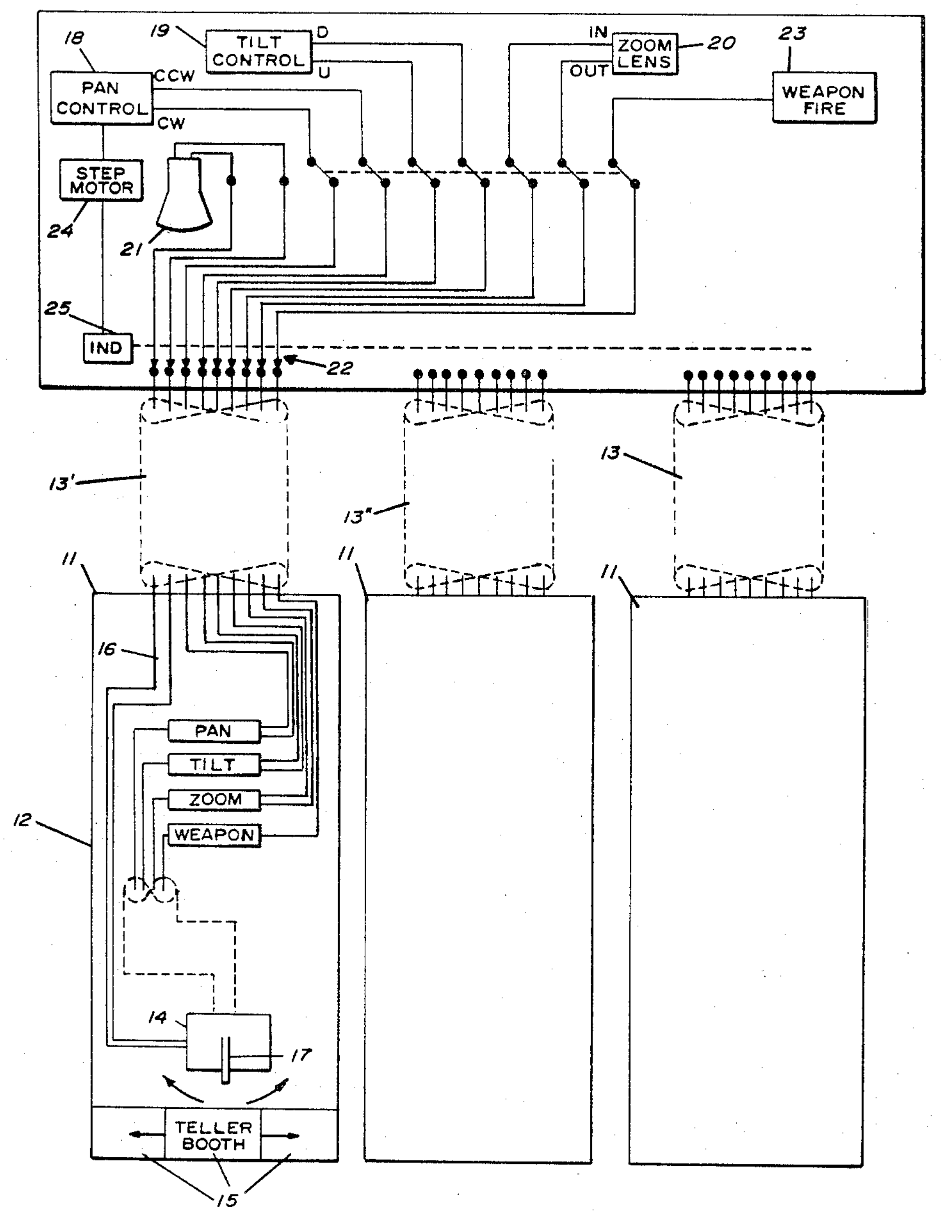
FIGURE 1 is a block diagram illustrating the manner in which a plurality of protected areas are connected with a central control station according to a preferred embodiment of the invention.

Reference is now made specifically to FIGURE 1 of the drawings wherein a plurality of areas or stations 11 to be protected are coupled selectively and sequentially with central observation and control station 12 via cables 13, 13' and 13''. Although three of the protected areas 11 are shown, with associated cables 13, it is to be understood that any feasible number, approximately 20, would actually be connected with central station 12 in a typical protection system according to the invention. Protected areas 11 may be any place that a robbery or burglary is likely to occur, such as banks, liquor stores or supermarkets. Because the apparatus at each of the protected areas 11 is essentially identical, only the device associated with a bank is illustrated and will be described. At bank 11, closed circuit television camera 14, which preferably is responsive to optical images in the visible and infrared ranges so that observations can be made during daylight and darkness, is positioned so that the entire area to be observed can unobstructively reach the camera lens field of view as the camera is being panoramically scanned. To this end, camera 14 is preferably mounted close to the bank ceiling, along one of the side walls, midway between the front door and rear wall and has the lens thereof directed toward teller booths 15. During panoramic scanning of camera 14, the camera lens is tilted toward booths 15 so that the image picked up by the camera and transmitted via co-ax 16, that is a part of cable 13, to monitor 20 at central station 12 encompasses the area from the floor immediately before the booths to approximately seven feet into the air.

Mounted on camera 14 is weapon 17 that is adapted to fire a projectile at the center of the image in the camera lens field of view. The projectile fired from weapon 17 may be a bullet or the like, although it is preferably of the non-lethal, tranquilizing type that induces sleep and does not inflict permanent damage to the person at whom it is directed but which will temporarily immobilize him.

Control of the panoramic scanning and tilt motions of camera 14, as well as control of weapon 17, is in response to signals coupled from central station 12 to bank 11 at a time when time division multiplexing switch 22, at the central station, is connected with the leads in cable 13'. Each of circuits 18, 19 and 20, for respectively controlling camera panning, camera tilt angle and camera lens zoom action, derives a voltage on one of two outputs. The voltages deriving from circuits 18–20 control the drive of motors at the camera site in one of two directions to panoramically scan camera 14 clockwise and counter clockwise, to tilt the camera upwardly and downwardly, and to drive the camera lens inwardly and outwardly. Pan control circuit 18 is arranged so that camera 14 automatically begins panning from one wall of bank 11 toward the other wall thereof when multiplexing switch 22 initially engages the contacts of cable 13. Camera panning continues for two full sweeps of bank 11, i.e. the lens of the camera 14 sweeps from the front wall of bank 11, where the door is located, to the rear wall and back to the front wall each time multiplexing switch 22 engages cable 13'. If during the panoramic sweeping of camera 11, the guard at station 12 observes any suspicious occurrences on his television monitor 21, he terminates the automatic panning action of the camera and manually directs it to that area. The guard then manually activates tilt angle and zoom lens controllers 19 and 20 to aim the lens directly at the region of interest. With the magnification afforded with the zoom lens, the guard can ascertain readily if a crime is being committed. In addition, he can very accurately aim weapon 17 at a desired segment of the criminal's body and thereafter manually activate firing signal controller 23, whereby a projectile is fired from the bore of weapon 17.

After the criminal has been apprehended with the aid of the projectile fired from weapon 17, the guard at central station 12 returns pan control 18 to automatic operation. When the panning cycle of the bank 11 is completed, a signal is derived from circuit 18 to activate step motor 24 so that multiplexing switch 22 is positioned to engage contacts in cable 13''. Thereby, the cameras, motors and weapons at each of stations 11 that is protected are sequentially coupled to central station 12 and it is only necessary to provide a single control system and monitor at the central station.

To enable the operator at central station 12 to be apprised of which station is at any time under surveillance, step motor 24 is coupled to indicator 25 that may take form of a conventional shaft driven counter having a maximum count equal to the number of steps of the motor. If the number of steps of motor 24 does not equal the number of stations 11 being monitored, the motor can be provided with internal circuitry whereby pulses are derived to enable more rapid stepping to occur for the shaft positions between the last and first stations being protected.

Another alternative that can be employed to reduce the number of leads between each of stations 11 and central station 12 and to enable a telephone line to extend between the stations is to time division multiplex the control signals from the central station to the guarded stations. In such a system, each cable 13 includes a coaxial line for the video signal deriving from camera 14 and a single of pair of leads for synchronously connecting the pan, tilt angle, zoom and fire controlling circuits 18, 19, 20 and 23 at station 12 with corresponding detection circuits at stations 11.

In a typical system wherein the activities at twenty locations are monitored from a single central facility, the average period to pan automatically each guarded station 11 is approximately 10 seconds. Therefore, the total time necessary to monitor all twenty locations is approximately 3 minutes. Since a robbery or burglary cannot usually be committed in less time than 3 minutes, this arrangement enables complete protection of all twenty guarded facilities with but a single central station. While the total period required to monitor all twenty locations is markedly increased when any unusual occurrences are detected this increase does not materially alter the effectiveness of the system because of the extremely low probabilities involved in having two of the twenty locations simultaneously robbed or burglarized.

Figure 2:
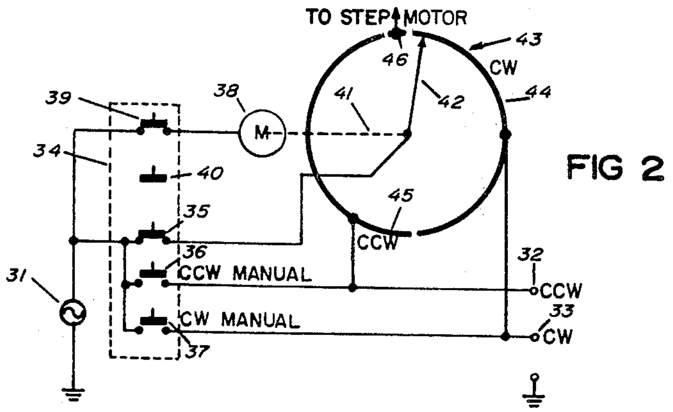
FIGURE 2 is a circuit diagram of a preferred embodiment of the central station pan control network.

Reference is now made to FIGURE 2 of the drawings, a circuit diagram of a preferred network for panoramic controller 18. A.C. power from source 31 is selectively coupled between one of output terminals 32 or 33 and ground to provide activating signals for panning camera 14 counter clockwise and clockwise, respectively. Manual and automatic control of power from source 31 to terminals 32 and 33 is in response to activation of switch 34 that includes contacts 35–37, ganged together so that only one of them can be closed at any time. Switch 34 also includes contact 39 that is ganged with contact 35 so that both are always simultaneously opened or closed, in addition to an open circuited "off" contact 40, which when energized open circuits each of contacts 35–37 and 39.

A.C. source 31 also feeds power to synchronous A.C. motor 38 through contact 39 of switch 34. Shaft 41 of motor 38 drives rotating contact 42 in a clockwise direction at approximately six revolutions per minute. Contact 42 is part of switch 43 that includes three arcuate conducting segments 44–46, each being insulated from the other. Segments 44 and 45 of switch 43 each cover an arc of approximately 170° while segment 46 has an extent on the order of 10°, and all of these segments are arranged to be individually engaged by contact 42 that is selectively connected to source 31 via contact 35. Segments 44 and 45 are connected with terminals 32 and 33, respectively, while segment 46 is connected to the input of step motor 24, FIGURE 1.

During normal automatic operation, contacts 35 and 39 are closed whereby power is fed from source 31 to wiper 42 and motor 38. Thereby, power is supplied in sequence to counter clockwise and clockwise output terminals 32 and 33 and thereafter to step motor 24. In consequence, camera 14 is first panned in a counter clockwise direction, from the front door to the rear wall of bank 11 and then back again in the clockwise direction. After camera 14 returns to its initial position, aimed toward the front wall of bank 11, source 31 feeds a pulse of A.C. power to motor 24 via conducting segment 46. The pulse of A.C. power is detected, causing motor 24 to be stepped and multiplexing switch 22 to be transferred from the contacts of cable 13′ to the contacts of cable 13″. As the contacts of cable 13″ are engaged by the contacts of multiplexing switch 22, wiper 42 is just coming into contact with conducting segment 45 of the switch 43. Thereby, a counter clockwise control signal is fed to terminal 32 and cable 13″ and camera 14 at the second guarded location 11 begins counter clockwise panning motion.

When the guard at central station 11 observes an unusual occurrence at the station 11 being guarded, he energizes contact 40 of switch 34, whereby contacts 35 and 39 are open circuited; motor 38 stops rotating and power is decoupled from terminals 32 and 33. Thereby, the panning motion of the camera 14 is terminated and the camera remains stationary, enabling the operator to position it manually in a clockwise or counter clockwise direction by pressing the push buttons coupled with contacts 36 and 37. Simultaneously, the guard may also desire to control the tilt angle and zoom lens of the camera 14, as he can do by activating push buttons in circuits 19 and 20 that are connected in networks similar to contacts 36 and 37.

Figure 4:
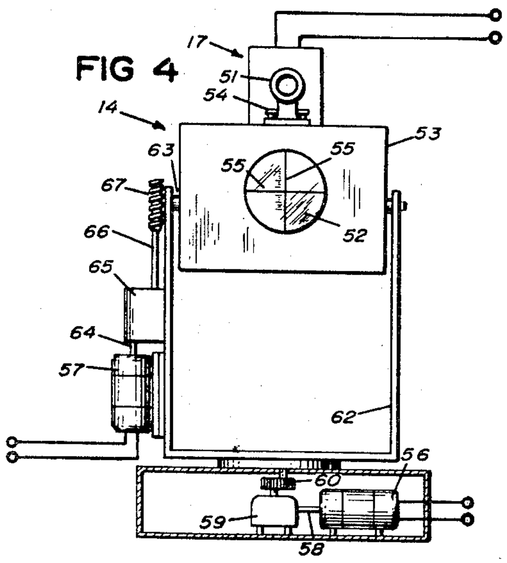
FIGURE 4 is a front view of the camera and gun illustrated in FIGURE 3.
Figure 3:
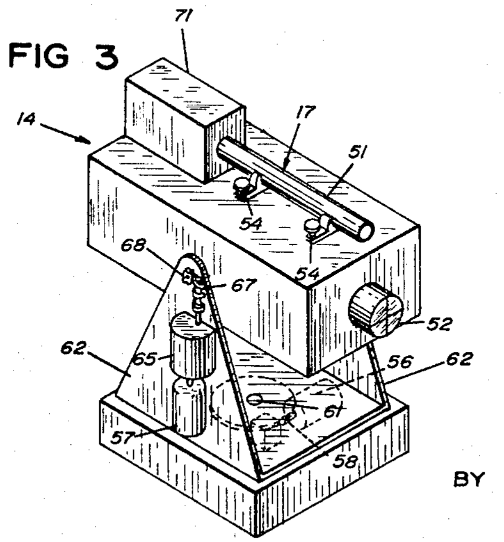
FIGURE 3 is a perspective diagram of a closed circuit television camera with a weapon mounted thereon according to the present invention.

Reference is now made to FIGURES 3 and 4 of the drawings, views of the television closed circuit camera in combination with weapon 17, which basically is a rifle having a barrel 51 with its longitudinal axis aligned with lens 52, mounted on camera casing 53 by screws 54. Screws 54 adjust the vertical rifle position so that the center of the camera lens field of view is approximately coincident with the point at which the projectile fired from weapon 17 is aimed. To enable the guard at station 11 to ascertain where the center of the lens field of view is located, hence where weapon 17 is aimed, cross hairs 55 are provided on the lens face and meet at the center thereof.

Camera 14 is rotated in the horizontal and vertical planes by motors 56 and 57, respectively. Shaft 58 of motor 56, that is responsive to control signals derived from terminals 32 and 33, FIGURE 2, is coupled through gear box 59 and gear train 60 to shaft 61 that rotates mounting bracket 62 with which it is fixedly attached. Bracket 62 is journaled with horizontally extending shaft 63, having camera casing 53 fixedly mounted thereon. Shaft 63 is driven in response to rotation of shaft 64 of motor 57 through a coupling comprising gear box 65, shaft 66, gear 67 and pinion 68. Motor 57 is responsive to control signals derived from tilt angle control circuit 19 to rotate camera 53 in the vertical plane.

Figure 5:
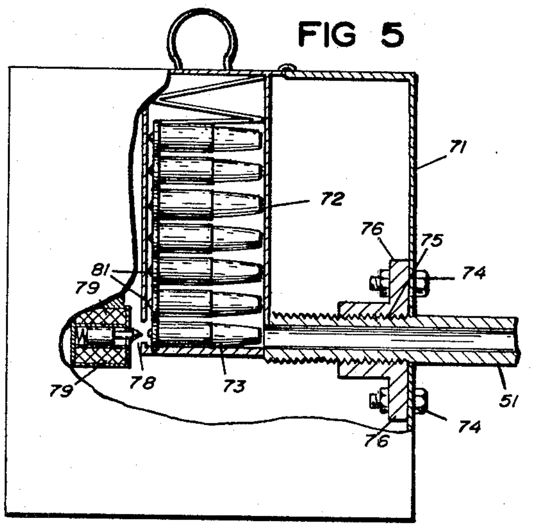
FIGURE 5 is a side sectional view of a preferred embodiment of the mechanism for supplying projectiles to the weapon in response to a signal from the remote central station.

Mounted on the top of casing 53 is casing 71 for receiving a cartridge of pellets, preferably containing a tranquilizing drug, which pellets can be fired from weapon 17. As shown in the side sectional view of casing 71 in FIGURE 5, cartridge 72 includes a plurality of pellets 73 gravity fed to the end of barrel 51 that is fixedly mounted to the casing by screws 74 that engage threaded bores 75 on gun barrel flange 76.

Pellets or projectiles 73 are fired on a conventional, automatic reload principle in response to activation of iron firing pin 78. Firing pin 78 is triggered in response to energization of solenoid 79 which surrounds it and applies a sufficient magnetic field thereto when weapon firing network 23 is triggered. Firing pin 78 is maintained in situ, aligned with cap 81 of pellet 73 by a conventional centering guide arrangement.

Figure 6:
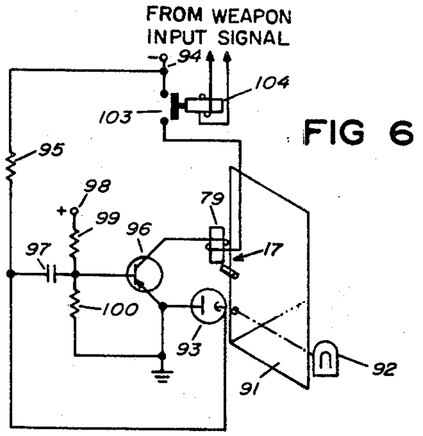
FIGURE 6 is a diagrammatic illustration of another embodiment of the invention wherein a weapon is activated by a criminal breaking a light beam.

Reference is now made to FIGURE 6 of the drawings wherein the further embodiment of the invention is schematically illustrated. In this embodiment of the invention, the same control circuitry for panning, tilting and moving the zoom lens of the camera 14 is employed as in the system of FIGURES 1–5. The weapon 17, however, is not mounted on the camera but is placed in doorway 91 and directed to fire the pellets emerging from it along the threshold. The path across doorway 91 is also traversed by a collimated light beam from light source 92, which beam is focused on photo resistance 93.

The terminals of photo resistance 93 are connected to ground and the negative D.C. potential at terminal 94 via biasing resistance 95. The junction between resistances 93 and 95 is connected to the base of PNP transistor 96 via pulse coupling capacity 97 that also serves to block the application of the D.C. voltage at terminal 94 to the transistor base. The base of transistor 96 is normally biased at cut off by the positive D.C. potential supplied thereto from terminal 98 via the voltage divider comprising resistors 99 and 100. The collector circuit of grounded emitter transistor 96 is connected to the negative D.C. bias at terminal 94 through the series combination of firing pin energizing solenoid 79 and the normally open contacts 103 of latching relay 104. Relay 104 is energized in response to a signal from weapon firing network 23 to close contacts 103 and supply power to the emitter collector path of transistor 96. Prior to activation of relay 104, of course solenoid 79 cannot be energized and after activation of the relay any interruption of the light beam directed on photo resistor 93 causes a pellet to be fired from weapon 17 until the latching action of relay 104 is released.

In response to the beam directed toward photo resistor 93 being broken, the voltage at the junction between resistors 93 and 95 suddenly increases in a negative direction. This sudden voltage change is coupled through capacitor 97 to the base of normally cut off transistor 96 to energize the collector circuit thereof and fire solenoid 79 if contacts 103 are closed. Thereby, an escaping criminal detected with the closed circuit multiplexing television system, in effect, shoots himself when he crosses doorway 91.

While I have described and illustrated several specific embodiments of my invention, it will be clear that variations of the details of construction which are specifically illustrated and described may be made without departing from the true spirit and scope of the invention as defined in the appended claims.

I claim:

1. A system for protecting a plurality of areas from a central station comprising:
- a television camera disposed at each of said areas;
- energy releasing means capable of immobilizing a human disposed at each of said areas operatively associated with each television camera, said energy releasing means being responsive to a trigger signal;
- a television receiver at said central station;
- control means disposed at said central station for controlling the field of view of said television cameras at said plurality of areas, said control means normally effecting an automatic panoramic scanning of said television cameras;
- multiplexing means at said central station for normally automatically coupling said television receiver and said control means with each of said television cameras one at a time in a predetermined sequence for a predetermined time duration;
- manual override means associated with said control means for manually terminating the automatic panoramic scanning and for manually terminating operation of said automatic multiplexing means at will, whereby a selected television camera is maintained in coupled relationship with said television receiver and manual control of the field of view of said selected television camera is effected; and,
- trigger signal generating means at said central station for generating a trigger signal for the energy releasing means associated with said selected television camera.

2. A system as defined in claim 1, wherein said energy releasing means is mounted with said television camera such that the aim of said energy releasing means is towards the center of the field of view of said television camera.

3. A system as defined in claim 2, wherein each of said television cameras include means for providing an indication of the center of its field of view.

4. A system as defined in claim 3, wherein said indicating means comprises a pair of cross hairs on the camera lens, said cross hairs intersecting approximately at the center of said lens.

5. A system as defined in claim 1, wherein said energy releasing means is responsive only to the generation of said trigger signal and a second signal derived from a predetermined area being crossed by an object.

6. A system as defined in claim 5, wherein said second signal is derived by a photo-electric means comprising means for projecting a light beam across said area, and means on which said beam is normally focused.

References Cited

UNITED STATES PATENTS

| | | | |
|---|---|---|---|
| 2,099,764 | 11/1937 | Touceda | 89—41.7 |
| 2,359,032 | 9/1944 | Gott | 178—6 |
| 3,258,531 | 6/1966 | Reindl | 178—7.92 |

ROBERT L. GRIFFIN, *Primary Examiner.*

J. ORSINO, *Assistant Examiner.*

U.S. Cl. X.R.

178—6, 7.92; 250—215